Sept. 28, 1954    M. H. RIPPLE    2,690,330
FOOD MIXER
Filed March 18, 1953
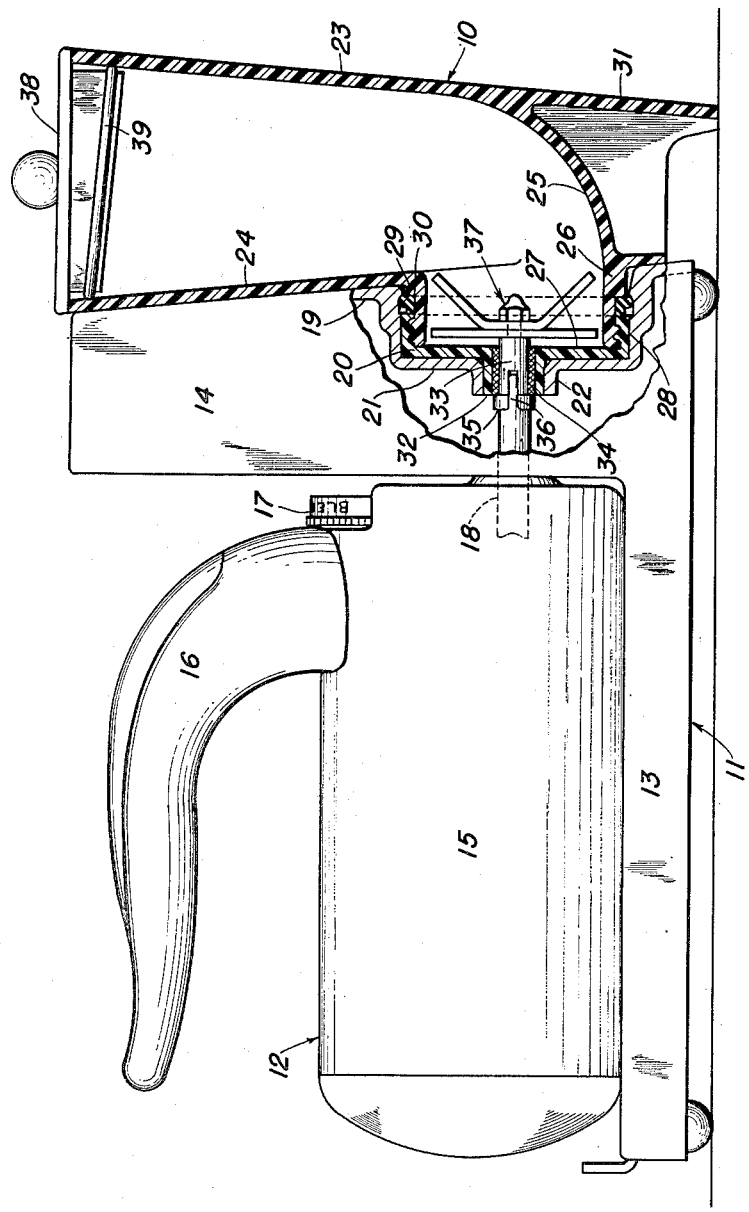
INVENTOR.
*Melvin H. Ripple*
BY *Richard P. Fitzsimmons*
ATTORNEY.

Patented Sept. 28, 1954

2,690,330

UNITED STATES PATENT OFFICE 2,690,330

FOOD MIXER

Melvin H. Ripple, Canton, Ohio, assignor to The Hoover Company, North Canton, Ohio, a corporation of Ohio Application March 18, 1953, Serial No. 343,122

6 Claims. (Cl. 259—110)

The present invention relates to food mixers and more particularly to a blender for attachment to the power stand of a food mixer.

The specific details of the power stand is disclosed and claimed in my copending application Ser. No. 343,121, filed concurrently herewith.

According to the present invention the rotary shaft of the blender faces laterally from the unit proper and is provided on its laterally facing end with a power receiving connection for detachable driving engagement with the power take-off shaft of a power unit. The laterally extending drive shaft is rotatably mounted in a closure for a hollow protuberance extending laterally from one side wall of the blender unit and carries cutter or blender blades which rotate on a horizontal axis within the hollow interior of the protuberance. The interior of the bottom wall of the blender receptacle merges with the interior bottom of the hollow protuberance and slopes upwardly in a curve so as to merge with the interior of the rear wall of the receptacle opposite the protuberance. The exterior of the closure plate for the protuberance is formed to interfit with the walls of a recess in the rear wall of a mixer power stand and is provided with means for detachably securing the protuberance within the recess.

The closure plate for the recess of the protuberance carries the blender shaft and is removable so that the blender blades may be easily removed for cleaning purposes.

The closure for the recess of the protuberance is provided centrally with an open ended annular extension in which the bearing for the blender shaft is mounted, which extension interfits with the inner-surface of an open ended annular extension in the inner wall of the recess of the power stand to properly align the power receiving connection on the end of the blender shaft with the power take-off connection of a power unit mounted on the power stand.

The blender receptacle may be made of glass, a transparent plastic or any other suitable material.

Other objects and advantages of the present invention will become apparent as the description proceeds when taken in connection with the accompanying drawings in which:

The single figure is a side view of the power stand and blender of this invention with a blender unit shown in section to better show its details.

Referring to the drawings the blender unit is generally indicated by the reference numeral 10, the power stand by the reference numeral 11 and the power unit by the reference numeral 12.

The power stand 11 includes a flat supporting base 13 and an upwardly extending standard 14 upon which the power unit 12 may be supported as more particularly disclosed in my copending application above referred to.

The power unit 12 includes a casing 15 housing a driving motor, a carrying handle 16 and a control dial 17, by which the speed of the motor may be controlled in a manner well known in the art. The power unit 12 may be supported on the flat base 11 in the manner disclosed in my above mentioned copending application. The motor is geared to a pair of shafts extending downwardly from the casing 15 for receiving mixers for ordinary mixing operations and the motor armature is directly connected to a shaft 18 which extends forwardly through the front of the casing 15 for a purpose which will later appear.

The rear wall 19 of standard 14 is formed with an inwardly extending recess 20 closed by a wall 21 having an open ended annular extension 22 in alignment with the shaft 18 when the power unit 12 is mounted on the base 13.

The blender unit 10 is in the form of an open top receptacle having side walls, a front wall 23, a rear wall 24 and a bottom wall 25. The rear wall 24 is formed with an open ended hollow protuberance 26 of a shape and size to fit loosely within the recess 20 of the pedestal 14. The rear end of the hollow protuberance 26 is closed by a removable closure 27 having an interiorly threaded flange 28 threaded onto cooperating threads on the exterior of the protuberance 26 as shown. A resilient ring 29, of rubber or any other suitable material is clamped between the end of the flange 28 and a shoulder 30 near the inner end of the protuberance 26. The ring 29 serves to detachably hold the protuberance 26 within the recess 20 by frictional engagement with the inner surface of the walls thereof. A groove for receiving the ring 29 may be formed on the inner surface of the walls of the recess 20 but that expedient is not absolutely essential. The rear wall 23 may be extended to form a supporting leg 31 to steady the blender unit 10 when it is supported on the power stand 11.

The closure 27 is formed with a rearwardly extending open ended annular extension 32 having a nice fit with the bore of the extension 22. A blender shaft 33 is rotatably mounted on the interior of the extension 32 by any suitable means such as by a bearing 34 as shown. The end of the shaft 33 is in alignment with the armature shaft 18 when the blender unit 10 and power unit 12 are mounted on the power stand 11 as shown and is provided with a power receiving connection 35 for detachable driving engagement with a power take-off connection 36 on the end of the shaft 18.

Mounted on the inner end of the shaft 33 within the interior of the hollow protuberance 26 are cutters or blender blades 37 which rotate on a horizontal axis as shown. The inner surface of the bottom wall 26 merges with the bottom inner surface of the recess in the protuberance 26 and curves upwardly in sort of an arc to merge with the inner surface of the rear wall 23.

If desired the open top of the blender receptacle may be closed by a lid 38 frictionally held in place by a resilient ring 39.

With the parts of the device in place as shown the substances to be blended, including solids if any, are placed in the blender unit 10. The arc of lower wall 25 will cause the solids to gravitate into the interior of the protuberance 26 where they may be contacted by the blades 37. When the motor is started the blades 37 will be rotated at a high speed to disintegrate or comminute the solids and blend them with any liquids present.

Since the blades 37 are within the interior of the recess of the protuberance 26 the centrifugal action will not cause the materials being blended to be thrown out of the top of the receptacle. The propelling action of the blades 37 will cause the material to be swirled outwardly into the receptacle proper upwardly along the arc of wall 25. Any non-comminuted solids will gravitate backwardly into contact with the blades 37.

It has been found in practice that a blender constructed according to the present invention produces excellent blending results with all types of materials. The blending action is much superior to the usual type in which the blender blades rotate on a vertical axis.

While I have shown but a single embodiment of my invention it is to be understood that that embodiment is to be taken as illustrative only and not in a limiting sense. I do not wish to be limited to the particular structure shown and described, except as limited by the scope of the claims, but wish to include all equivalent variations thereof.

I claim:

1. A blender unit comprising; a receptacle; said receptacle having side walls, a bottom wall, a front wall and a rear wall; a protuberance extending rearwardly from said rear wall adjacent said bottom wall for detachable connection to a power stand of a food mixer; a shaft mounted on said protuberance for rotation on a horizontal axis and extending through the rear thereof for connection to a power take-off of a food mixer and blender blades mounted on said shaft interiorly of said receptacle for rotation on a horizontal axis, said protuberance being formed with a rearwardly extending recess communicating with said receptacle and said blender blades being mounted within the confines of said recess.

2. A blender unit according to claim 1 in which said bottom wall slopes upwardly and forwardly from the bottom of said recess and merges with said front wall.

3. A blender unit according to claim 1 including a removable closure for the rear of said recess and said shaft and blender blades being carried by said closure.

4. In a food mixer, a power stand having a flat base for supporting a power unit provided with a horizontally rotating power take-off shaft, said power stand including a wall formed with an inwardly extending recess in alignment with the power take-off shaft of the power unit when the latter is supported on said base, a blender unit, said blender unit including a receptacle provided with a protuberance detachably supported within the said recess, a blender shaft supported by said protuberance for rotation on a horizontal axis and extending through said protuberance for detachable connection with the power take-off of the power unit and blender blades mounted within said receptacle for rotation on a horizontal axis, said protuberance being of hollow formation so as to form a recess extending from and in communication with said receptacle and said blender blades being rotatable within the confines of the recess of said protuberance.

5. In a food mixer according to claim 4 in which said receptacle is formed with a front wall opposite said protuberance and with a bottom wall, said bottom wall sloping upwardly and away from the bottom of the recess of said protuberance so as to merge with said front wall.

6. In a food mixer according to claim 4 including a removable closure for the rear end of the recess of said protuberance and said blender shaft and blades being carried by said closure.

References Cited in the file of this patent

UNITED STATES PATENTS

| Number | Name | Date |
|---|---|---|
| 769,818 | Cunneen | Sept. 13, 1904 |
| 1,268,601 | Nielsen | June 4, 1918 |
| 2,350,488 | Collins | June 6, 1944 |

FOREIGN PATENTS

| Number | Country | Date |
|---|---|---|
| 249,829 | Switzerland | July 31, 1947 |